Figure 1:
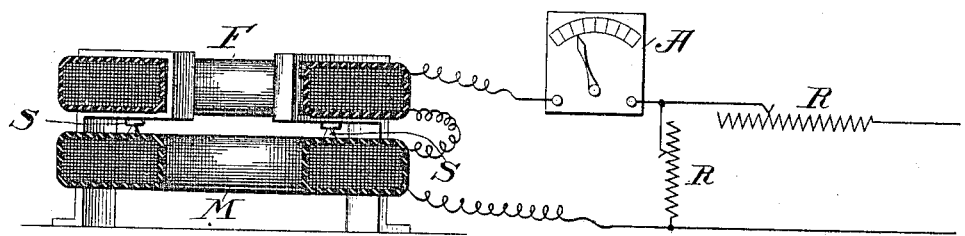

No. 831,609. PATENTED SEPT. 25, 1906.
C. HERING.
ELECTRICAL MEASURING INSTRUMENT.
APPLICATION FILED AUG. 3, 1905.

Witnesses:
Geo. E. Gackett
Chas. E. Parker.

Inventor:
Carl Hering,
by Byrnes & Townsend.
Attys.

UNITED STATES PATENT OFFICE.

CARL HERING, OF PHILADELPHIA, PENNSYLVANIA.

ELECTRICAL MEASURING INSTRUMENT.

No. 831,609.

Specification of Letters Patent.

Patented Sept. 25, 1906.

Application filed August 3, 1905. Serial No. 272,608.

*To all whom it may concern:*

Be it known that I, CARL HERING, a citizen of the United States, residing at 929 Chestnut street, in the city of Philadelphia, county of Philadelphia, and State of Pennsylvania, have invented certain new and useful Improvements in Electrical Measuring Instruments, of which the following is a specification.

The object of my invention is to produce a simple and convenient instrument based on purely mechanical and electrical principles which will indicate with great precision and constancy when an electrical current has a certain definite strength, thereby enabling the usual electrical-current-measuring instruments to be tested for accuracy and to be recalibrated. It is particularly intended to be used as a concrete standard ampere and belongs to the same class of instruments as the concrete standard ohm and the concrete standard cell, as it indicates only a single-current strength, but does this with great precision and constancy and is not dependent on the constancy of steel magnets or springs, which are apt to change their values in time, and therefore cannot be relied upon as remaining constant. It is also independent of any chemical action or temperature and can be used for both direct and alternating currents.

Heretofore currents for standardizing instruments have usually been measured with a voltameter or with a potentiometer. The former besides being cumbersome involves chemical reactions and the latter a standard cell and a standard ohm besides a somewhat complicated apparatus. Both are subject to corrections, such as those for temperature, and both require skilled operators. My invention overcomes all these objections. It is capable of being used in central stations and by unskilled operators, is complete in itself, simple to handle, is not based on indirect measurements like those usually used, requires no corrections like that for temperature, and is simple in construction and cheap. It is based on the dynamometer principle—namely, on the mutual attraction of two coils through which the current to be measured passes. One of these coils is fixed, and the other is movable. The movable one is held up against the lower side of the fixed one by the attraction due to the currents in both. Its weight is so adjusted by the maker that it just overbalances this attraction when the current has the standard value. At that moment the movable coil will fall away from the fixed one, thereby indicating when the current has its standard value. To use the instrument, the current is first made greater than the standard value, the movable coil being thereby held up against the fixed one. The current is then diminished very gradually until the movable coil drops. At exactly that moment the current has the standard value. It is intended to be used as a secondary standard to calibrate current-measuring instruments for that particular value. The measuring instrument to be calibrated is placed in series with it and its reading is taken at the moment when the coil drops. My instrument can be made for indicating any one particular value. Hence with several of them several points can be calibrated on the measuring instrument which is to be adjusted, or by the adjustment of counterweights to partly balance the weight of the coil or by means of shunts the same apparatus may be used to indicate several standard currents. It may also be used indirectly as a standard of voltage for calibrating voltmeters by connecting the voltmeter to be calibrated to the ends of a known resistance through which a current is passing, which current is then standardized by means of my standard concrete ampere. Knowing the resistance and the current the voltage becomes known by Ohm's law. This method has the advantage of great simplicity, rapidity, can be carried out at the switchboard, and requires no standard cell, galvanometer, or potentiometer. When so used, it may be calibrated to read in volts directly, or it may be used directly as a volt standard by winding the coils with many turns of fine wire, giving the instrument a high resistance and connecting it across the two terminals of the voltmeter to be calibrated. The current which actuates it will then be proportional to the voltage if the resistance of the instrument remains constant, or it may be made to indicate watts by the usual method of passing the main current through one of the coils, while through the other is passed as shunt-current which is proportional to the voltage.

As the action of the instrument depends on nothing but the attraction of the current to itself, it is equally applicable to direct and to alternating currents, also to pulsating or intermittent currents. It indicates their effective values as distinguished from their mean values. As the attraction between two such coils is proportional to the product of the currents, and therefore to the square of the current when both coils are in series, it follows that the force which holds them together varies much more rapidly than the current. Hence the instrument becomes very sensitive to variations of the currents and may therefore be made to give a very accurate sharply-defined indication of the standard value. At the moment when the movable coil begins to drop even by only the slightest amount the distance from the other coil begins to increase, which then diminishes the attraction between them, and this diminution rapidly becomes greater as the coil falls, thereby making the indication a sharply-defined one, or, in other words, the coil is balanced in unstable equilibrium, and as soon as it begins to move the motion increases rapidly. When the current passes through both coils in series, it is evident that no corrections such as those for temperature are required. The only correction is that for the variations of the force of gravity due to difference of latitude and elevation. These are very slight, and as they are definite and fixed values they can be readily allowed for when such extreme accuracy is desired.

For a full understanding of my invention reference is made to the accompanying drawings, wherein—

Figure 2:
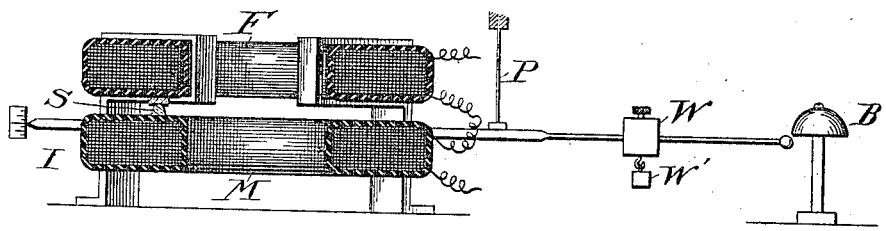

Figure 1 is a vertical cross-section of the instrument in its general form and a diagrammatic representation of its connection in circuit. Fig. 2 shows a modified form of the mounting and appurtenances of the moving coil.

In Fig. 1, F is the fixed coil. M is the movable coil below it. The coils are here shown as flat and circular; but they may of course be made of any desired cross-section and shape. They may, for instance, be made oblong and the fixed one may be given many turns, while the movable one may have few turns or even only one turn in order to make it light. For lightness the lower one may be made of aluminium. S S are stops which limit very precisely the distance between the coils when they are brought together. They ought not to be made of steel, as all magnetic materials should be excluded. They may be made of glass rounded at their ends. The ends need not be pointed. There should be three of these when the mounting is of the form shown in Fig. 1, and they should have corresponding sockets above to insure the coils being in exactly the same relative position each time they are brought together. The diagrammatic connections show that the two coils are in series. A is the ammeter to be calibrated. It is placed in series with the standardizing instrument. R and R are adjustable resistances which may be either in series or shunt or one in each for gradually diminishing the current until it reaches the standard value.

A current sufficient to sustain the weight of the coil through which it flows is apt to heat it. For this and for other reasons, such as mechanical considerations, &c., I prefer to mount the coil as shown in Fig. 2, in which its weight is partly balanced by the counterweight W, the whole being suspended by the strap or straps P. This has many other advantages also. If there are two supporting-straps or wires P, they may be used to lead the current to and from the movable coil. If they are free from any initial set, their spring action does not affect the indications of the instrument, for the moment there is the slightest movement of the coil it will drop, even if a slight spring action opposes it after it starts dropping. These straps may be replaced by knife-edges or horizontal torsion-wires or any of the well-known equivalents of pivots. If knife-edges are used, flexible connections for conducting the current may best be made near the knife-edges to avoid any spring action of those connections, or mercury-cups may be used, in which case the level of the mercury had better be the same as that of the horizontal turning axis to reduce the effects of unequal surface tensions. The weight W is best made adjustable, giving the maker a convenient means of adjusting the indication of the instrument to an exact current. By the addition of other properly-adjusted weights, like W', the same instrument may be made to indicate several currents of different values, thereby enabling several points on the scale of an ammeter to be calibrated, or one weight may be moved to several indicated positions on its guide. Different ranges of the instrument may also be obtained by inclining both coils at different angles in a vertical plane or by means of numerous other evident equivalents.

The indicator I opposite to a fixed mark indicates when the coil has dropped and enables the coil to be raised again for repeating the reading. A bell B may be used to indicate the drop by being struck by the moving part, or a contact closing an auxiliary electric circuit of a bell or buzzer may be used as an indicator, or any other evident equivalent may be used to indicate the drop. When not in use or while being shipped, the rod I may be clamped, so as to prevent the coil from moving.

The constant of the instrument may also be adjusted by varying the distance between the coils by means of the stops S.

For use with alternating or pulsating currents I may connect the moving coil to a damper or a mass having considerable inertia, so that the dropping of the coil is not actuated by the rapid fluctuations of the current, but only by the slowly decreasing effective value.

The expression "the weight of the movable coil being equal to the magnetic attraction between said coils when traversed by the current to be measured" is used in the claims to express the relation heretofore described—viz., that the weight of the movable coil when it is supported by the magnetic attraction alone, as in the arrangement shown in Fig. 1, or the effective weight of the movable coil when it is partially counterbalanced, as shown in Fig. 2, must be such that it just overbalances the magnetic attraction due to the currents in both coils when the current has the standard value.

I claim—

1. An electrical measuring instrument comprising fixed and movable coils, said movable coil adapted to be held in a definite position of unstable equilibrium by current in excess of a definite value traversing said coils and adapted to be released by a current less than this definite value and to drop beyond the control of the fixed coil, substantially as described.

2. An electrical measuring instrument comprising fixed and movable coils, and means for partially counterbalancing the movable coil, said movable coil adapted to be held in a definite position of unstable equilibrium by current in excess of a definite value traversing said coils and adapted to be released by a current less than this definite value and to drop beyond the control of the fixed coil, substantially as described.

3. An electrical measuring instrument comprising fixed and movable coils, and means comprising an adjustable counterweight for partially counterbalancing said movable coil, said movable coil adapted to be held in a definite position of unstable equilibrium by current in excess of a definite value traversing said coils and adapted to be released by a current less than this definite value and to drop beyond the control of the fixed coil, substantially as described.

4. An electrical measuring instrument comprising a fixed coil, and a movable coil adapted to be held in a position of unstable equilibrium and in definite relation to said fixed coil by current in excess of a definite value traversing said coils and adapted to be released by a current less than this definite value and to move beyond the control of the fixed coil, substantially as described.

5. An electrical measuring instrument comprising a fixed coil, a movable coil adapted to be held in a position of unstable equilibrium and in definite relation to said fixed coil by current in excess of a definite value traversing said coils and adapted to be released by a current less than this definite value and to move beyond the control of the fixed coil, and means for partially counterbalancing said movable coil, substantially as described.

6. An electrical measuring instrument comprising a fixed coil, a movable coil adapted to be held in a position of unstable equilibrium and in definite relation to said fixed coil by current in excess of a definite value traversing said coils and adapted to be released by a current less than this definite value and to move beyond the control of the fixed coil, and an adjustable counterweight for partially counterbalancing said movable coil, substantially as described.

7. An electrical measuring instrument comprising fixed and movable coils, said movable coil adapted to be held in a position of unstable equilibrium by current in excess of a definite value traversing said coils, and a device for indicating the drop of the movable coil when the current reaches a definite value, substantially as described.

8. An electrical measuring instrument comprising a fixed coil, a movable coil adapted to be held in a position of unstable equilibrium and in definite relation to said fixed coil by current in excess of a definite value traversing said coils, adjustable means for partially counterbalancing said movable coil, and a device for indicating the drop of the movable coil when the current reaches a definite value, substantially as described.

9. An electrical measuring instrument comprising fixed and movable coils, said movable coil adapted to be held in a definite position of unstable equilibrium by current in excess of a definite value traversing said coils, and adapted to be released by a current less than this definite value and to drop beyond the control of the fixed coil, and means for limiting the minimum distance between said coils, substantially as described.

10. An electrical measuring instrument comprising fixed and movable coils, the effective weight of the movable coil being equal to the magnetic attraction between said coils when they are at a certain definite distance apart and when traversed by the current to be measured, substantially as described.

11. An electrical measuring instrument comprising fixed and movable coils, and means for limiting the minimum distance between said coils, the effective weight of the movable coil being equal to the magnetic attraction between said coils when they are at this minimum distance apart and when traversed by the current to be measured, substantially as described.

12. An electrical measuring instrument comprising fixed and movable coils, means for limiting the minimum distance between said coils, supporting means for said movable coil permitting movement thereof about an axis, and means for partially counterbalancing said movable coil, the excess of weight of said movable coil being equal to the magnetic attraction between said coils when they are at this minimum distance apart and when traversed by the current to be measured, substantially as described.

13. An electrical measuring instrument comprising fixed and movable coils, means for limiting the minimum distance between said coils, supporting means for said movable coil permitting movement thereof about an axis, and adjustable means for partially counterbalancing said movable coil, the excess of weight of said movable coil being equal to the magnetic attraction between said coils when they are at this minimum distance apart and when traversed by the current to be measured, substantially as described.

In testimony whereof I affix my signature in presence of two witnesses.

CARL HERING.

Witnesses:
ERWIN F. FABER,
MARION R. FABER.